United States Patent [19]

Kato

[11] Patent Number: 5,262,948
[45] Date of Patent: Nov. 16, 1993

[54] WORD PROCESSOR

[75] Inventor: Eiji Kato, Tokyo, Japan

[73] Assignee: Canon Kabushiki Kaisha, Tokyo, Japan

[21] Appl. No.: 853,864

[22] Filed: Mar. 20, 1992

Related U.S. Application Data

[63] Continuation of Ser. No. 512,496, Apr. 20, 1990, abandoned, which is a continuation of Ser. No. 214,822, Jul. 1, 1988, abandoned, which is a continuation of Ser. No. 755,358, Jul. 16, 1985, abandoned.

[30] Foreign Application Priority Data

Jul. 18, 1984 [JP]  Japan ............... 59-147479

[51] Int. Cl.⁵ .............................. G06F 15/38
[52] U.S. Cl. ................. 364/419.13; 395/146
[58] Field of Search ............ 364/419; 395/144, 145, 395/146

[56]  References Cited

U.S. PATENT DOCUMENTS

| | | | |
|---|---|---|---|
| 3,980,994 | 9/1976 | Ying et al. | 364/200 |
| 4,125,868 | 11/1978 | Hruby et al. | 364/900 |
| 4,247,906 | 1/1981 | Corwin et al. | 364/900 |
| 4,330,845 | 5/1982 | Damerau | 364/900 |
| 4,464,730 | 8/1984 | Lawrence et al. | 364/900 |
| 4,650,349 | 3/1987 | Westreich | 364/900 |
| 4,785,413 | 11/1988 | Atsumi | 364/900 |

Primary Examiner—Rebecca L. Rudolph
Attorney, Agent, or Firm—Fitzpatrick, Cella, Harper & Scinto

[57] ABSTRACT

A text editing apparatus searches a desired character string from a group of stored characters and stores a word within a predetermined range which includes the desired character string into an input character memory.

8 Claims, 8 Drawing Sheets

WORD PROCESSOR

This application is a continuation of application Ser. No. 07/512,496 filed Apr. 20, 1990, now abandoned, which in turn is a continuation of application Ser. No. 07/214,822 filed Jul. 1, 1988, now abandoned, which in turn is a continuation of application Ser. No. 07/755,358 filed Jul. 16, 1985, now abandoned.

BACKGROUND OF THE INVENTION

1. Field of the Invention

The present invention relates to a text editing apparatus which can save input operation, and more particularly to a text editing apparatus which can reduce the number of keying operations of a keyboard when a character string which is identical to a previously inputted character string or a character string which is identical to a previously inputted character string except a small portion such as an end portion is to be reinputted.

2. Description of the Prior Art

Several means for reducing the burdens on users who interactively use computer application products, such as general purpose computers or word processors, by reducing the number of keying operations for character input have been put into practice. For example, 1) In a word processor, frequently used words and idioms are registered to simplify the input operation.

2) In certain personal computer operating systems (OS), "immediately preceding input line" in inputting a command is utilized to simplify the input operation. (For example, if a wrong file name is inputted in a command line and a correct file name is to be subsequently inputted, the entire line need not be inputted but the immediately preceding input command line is displayed and it is edited or corrected to form a correct input command).

3) In certain OS, an escape key is utilized to save the input operation. When a command or a file name is to be inputted, several leading characters thereof (which are sufficient to distinguish it from others) are keyed in and the escape key is depressed. The OS displays a corresponding command or file name, and it is appropriately edited or corrected.

The method (1) adds the burden of registration. Accordingly, it is not usual to register a number of words or idioms. The methods (2) and (3) are limited to the use in the command language of the OS and cannot be used in a usual input operation such as text editing.

In the method (1), the frequently used words and idioms are registered so that they may be used in inputting text. If a desired word/phrase can be selected from the previously inputted text and they can be used as an input word/phrase, the registration is not necessary and the input operations for many words/phrases can be saved.

In a conventional text editing apparatus, such as a word processor, the selection of the word/phrase inputted by an operator (searching of a desired word/phrase and determination of an input range) can be carried out by a word/phrase copying function. However, if the word/phrase copying function is frequently carried out during the input operation, the input operation is interrupted each time and the efficiency of the input operation is lowered.

Accordingly, a text editing apparatus which does not use the word/phrase copying function and does not impede the input operation is required.

SUMMARY OF THE INVENTION

It is an object of the present invention to provide a text editing apparatus which can save input operations when the same word/phrase is repetitively inputted.

In order to achieve the above object, in accordance with the present invention, a desired character string is retrieved from stored character strings and a word/phrase of a predetermined range which includes the character string is stored in an input character memory.

DETAILED DESCRIPTION OF THE PREFERRED EMBODIMENT

Figure 1A:
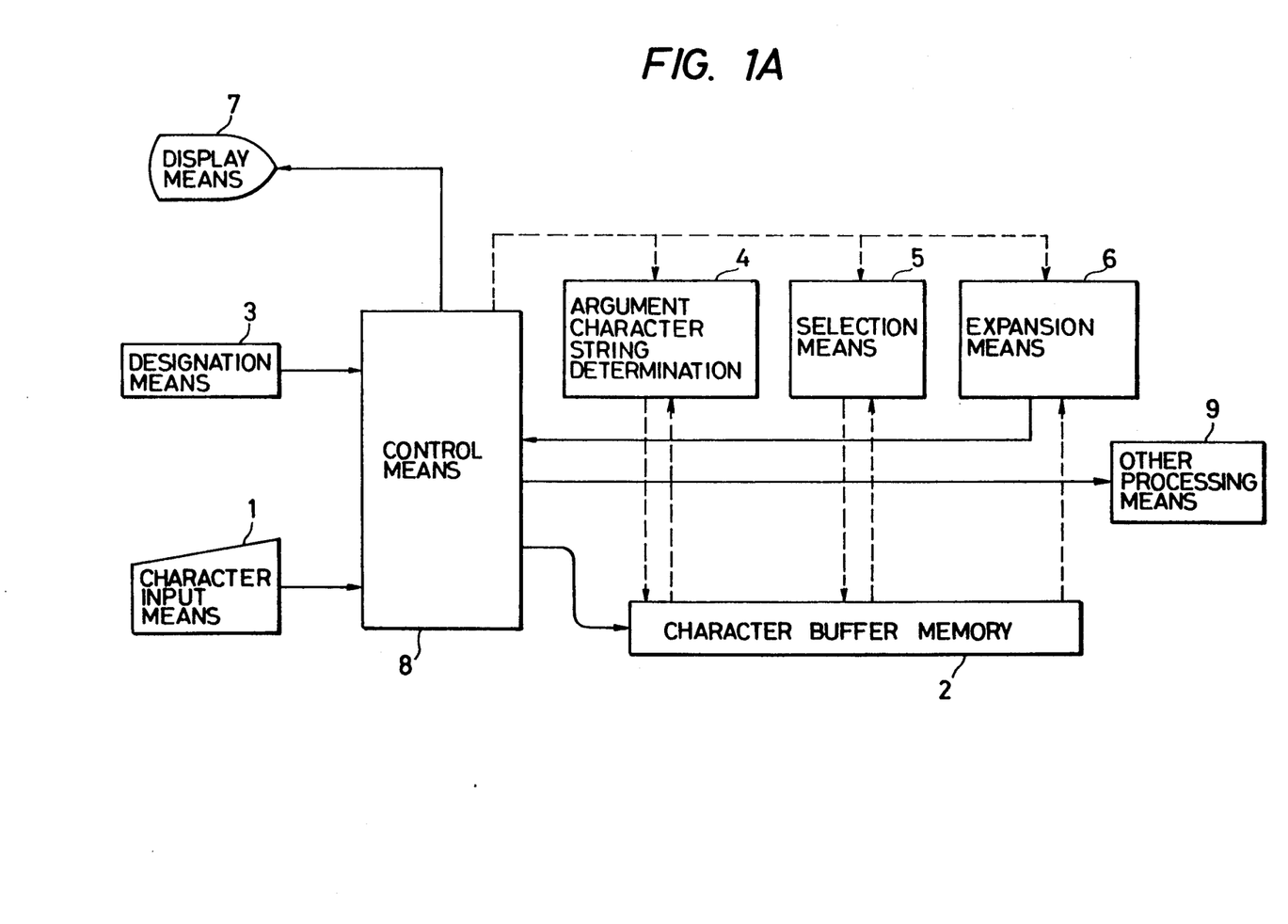
FIG. 1A is a block diagram of one embodiment of the present invention.

FIG. 1A is a block diagram of one embodiment of the present invention. Numeral 1 denotes character input means having a keyboard, and numeral 2 denotes a character buffer which stores up to a predetermined number of input character data (characters). The character buffer memory 2 holds up to the predetermined number of immediately previously inputted character (e.g. one page of characters). If more characters than the predetermined number are supplied to the character buffer memory 2, the oldest one of the stored characters is sequentially discarded so that the predetermined number of latest input characters are held.

Numeral 3 denotes designation means (having function keys, and control keys) for instructing operations to be described later. A specific control character (for example, DC2 or DC4 in the JIS Information Exchange Code C-6220) is inputted by the character input means 1 to the instruction means 3. The control character may be inputted by a special switch (not shown). Numeral 4 denotes means for determining an argument character string by an input from the character input means 1. The argument character string is a group of characters to be retrieved. Numeral 5 denotes selection means for retrieving the argument character string from the character buffer memory 2. It has a function to select a group of characters of a word/phrase which includes the designated argument character string. Numeral 6 denotes expansion means for writing the word/phrase (including the argument character string) selected by the selection means 5 into the character buffer memory 2. For example, the argument character string "ind" stored in the character buffer memory 2 is substituted by the selected word/phrase "independence". In this manner, the argument character string on the character buffer memory 2 is expanded to the word/phrase which includes the argument character string. Numeral 7 denotes display means for displaying the word/phrase expanded by the expansion means 6 so that the operator can determine whether the expanded word/phrase is a desired one or not. Numeral 8 denotes control means for controlling the above-mentioned means, and numeral 9 denotes other processing means.

Figure 1B:
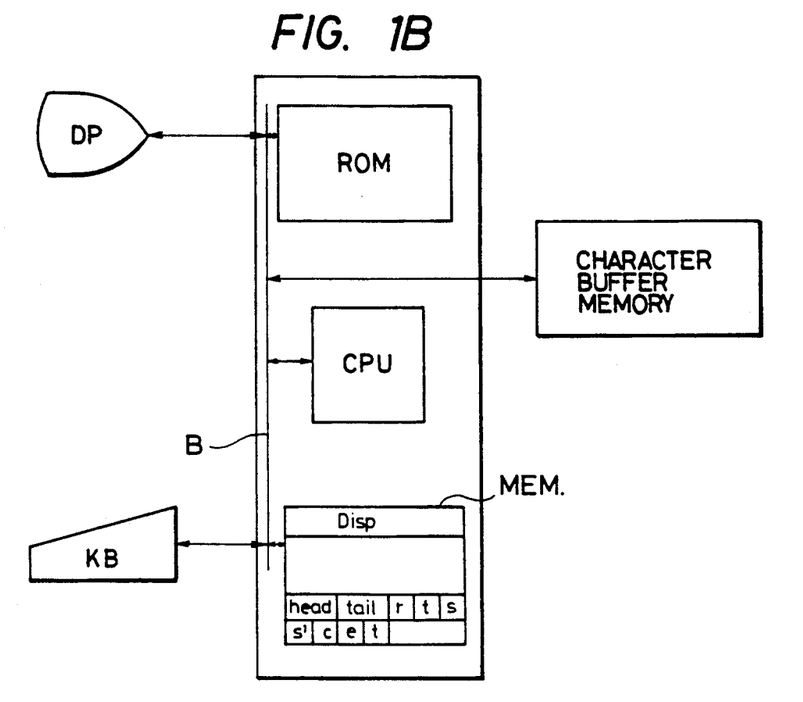
FIG. 1B shows an internal configuration of a control means shown in FIG. 1A.

FIG. 1B shows an internal configuration of control means 8 shown in FIG. 1A. KB denotes a keyboard which corresponds to the designation means 3 and the character input means 1. DP denotes a display which corresponds to the display 7. CPU denotes a processing unit which carries out logical operations and processings in accordance with a control procedure stored in a memory. ROM denotes a control memory which stores programs of control procedures shown in FIGS. 4 to 6. MEM denotes a memory which has an area Disp to store information to be displayed on the display DP, and pointer areas head, tail, r, t, s, s', c, e and f. BUF denotes a character buffer which corresponds to the character buffer 2. B denotes a bus through which address control data are transmitted. MEM, CPU and ROM correspond to the determination means 4, the selection means 5, the expansion means 6 and the other processing means 9.

In FIG. 1A, solid lines indicate actual data input/output and broken lines indicate controls or pointer operations.

The word/phrase expanded in the present embodiment is:

a) a group of characters (a word which is expanded by DC2) which starts with a set of characters which matches with the argument character string, and which ends immediately before a space, tabulation or carriage return character, or b) a group of characters (a line which is expanded by DC4) which starts with a set of characters which matches with the argument character string, and which ends immediately before a carriage return character.

Figure 2:
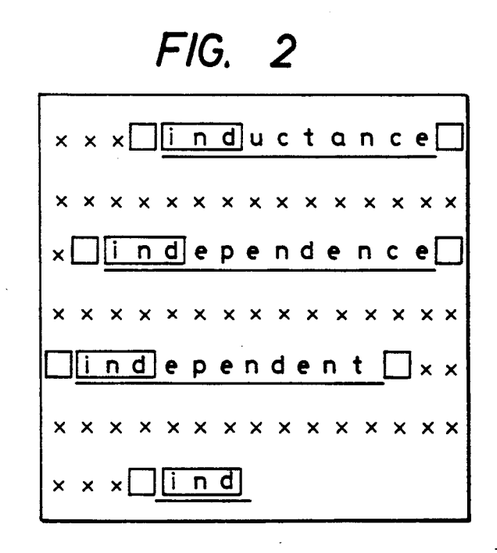
FIG. 2 illustrates an operation of the embodiment.

FIG. 2 shows an example of text including underscored words. Blank blocks indicate spaces. A character string enclosed in a block on the bottom line is an argument character string, and character strings enclosed in blocks in the other lines are retrieved character strings.

Let us assume that the text including the words (underscored) shown in FIG. 2 is to be inputted. The characters of the text are inputted by the character input means 1. They are displayed on the display means 7 and stored in the character buffer memory 2 by the control means 8 and the character information is also supplied to the other processing means 9. Since the character buffer memory 2 holds up to the predetermined number of most recent characters, the input characters are stored in the character buffer memory 2 as shown in FIG. 3.

Figure 3:
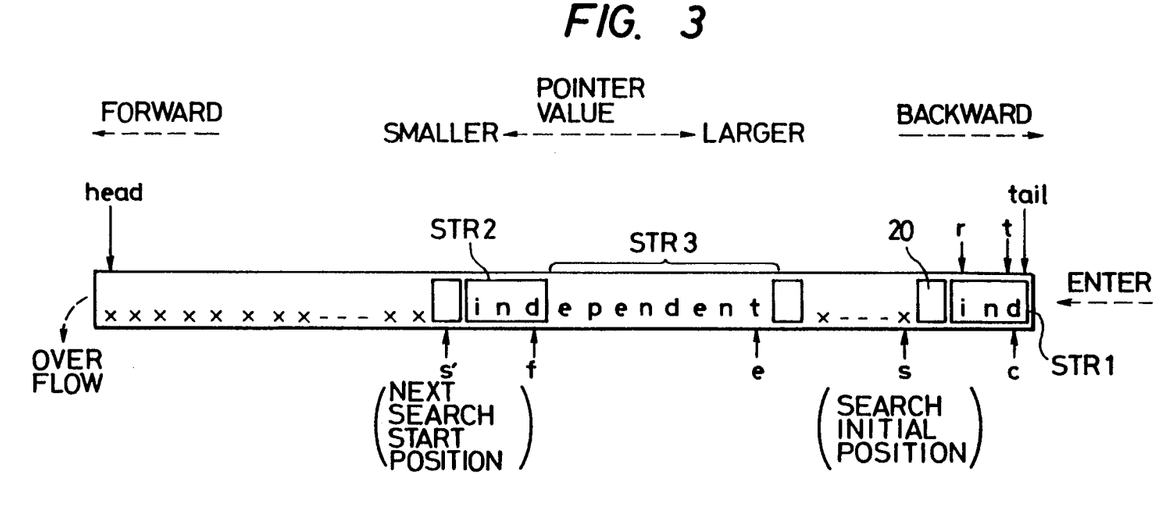
FIG. 3 shows a character buffer memory in the embodiment.

FIG. 3 shows a detail of the character buffer memory. Arrows show pointers. The pointers are:

pointer head: points to a start position of the character buffer memory.

pointer tail: points to an end position of the character buffer memory.

pointers r, t: point to start character position and end character position, respectively, of the argument character string.

pointers s, s': points to a retrieval start position.

pointer c: sequentially points to positions of characters to be compared when a search character string STR2 which matches with the argument character string STR1 is to be searched.

pointer e: points to the last position of a character string to be expanded.

pointer f: points to the end position of the argument character string for the expansion.

The head position on the character buffer memory is called forward and the tail position is called backward. The content of the head position is smaller than the content of the tail position. The input characters are sequentially added at the tail position and the overflow characters are discarded from the head position (ring buffer configuration). The character pointed to by the pointer tail is called a most recent input character.

Let us assume that the "ind" in the bottom line has been inputted and the control character DC2 is inputted to instruct the expansion to the word. Since it is the first trial to the input characters, the control means 8 calls the argument character string determination means 4 (set a flag, not shown).

Figure 4:
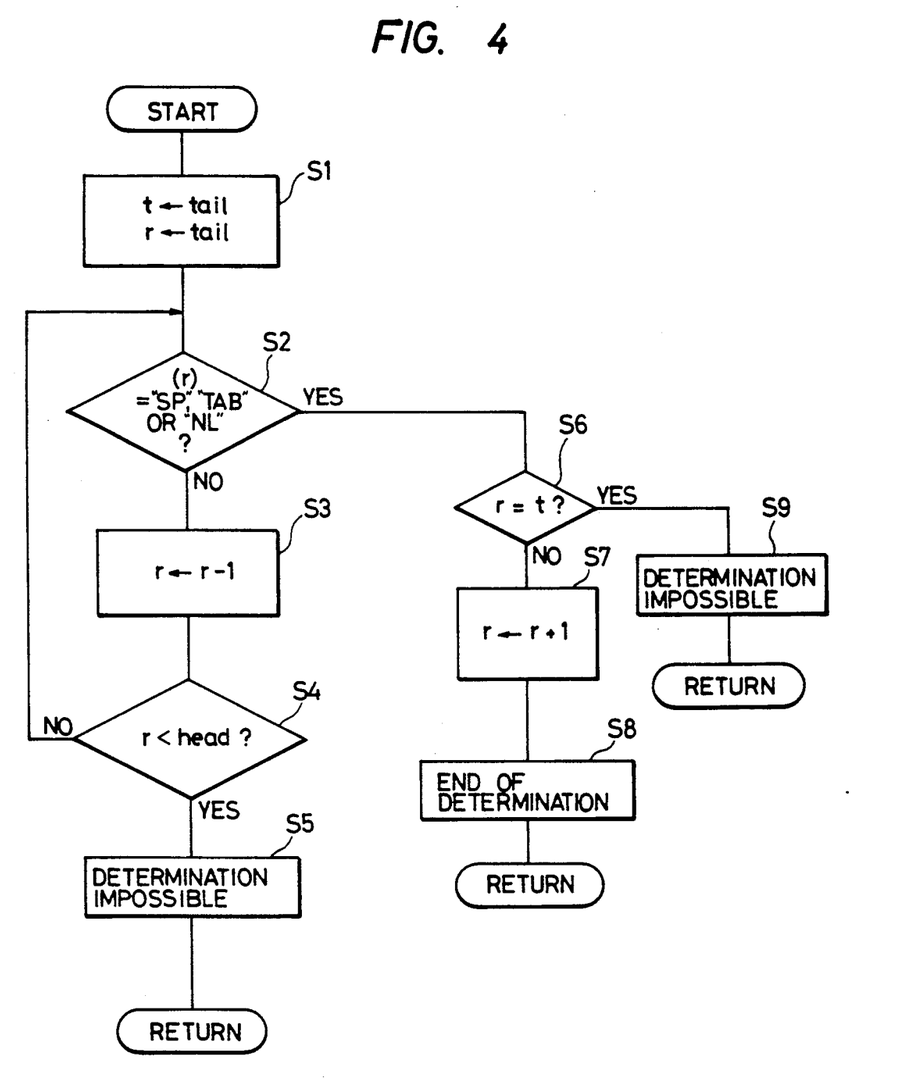
FIGS. 4, 5A, 5B and 6 are flow charts of processing algorithms in the embodiment.

FIG. 4 shows an algorithm to be executed by the argument character string determination means 4. In the present embodiment, the argument character string is a character string of most recent input characters following the last punctuation symbol 20 (e.g. space, tabulation or carriage return character) in the character buffer memory (that is, the characters from the pointer r to the pointer t). Accordingly, the pointer r in FIG. 3 moves to point "d", "n", "i", "space" and "i" in accordance with the algorithm shown in FIG. 4 so that the string STR1 "ind" is determined as the argument character string.

The steps shown in FIG. 4 are described below.

Step S1: The position of the most recent input character (at the tail position) is set into the pointers t and r. (t=r=tail)

Step S2: Whether the character pointed to by the pointer r is a punctuation character (space SP, tabulation TAB or carriage return NL) or not is checked.

Step S3: If the character pointed to by the pointer r is not a punctuation character, the content of the pointer r is incremented (toward the head position) to shift the pointer r to the left by one character position (r←r−1).

Step S4: Whether the position pointed to by the pointer r exceeds the head position of the character buffer memory or not is checked. If it does not, the control is returned to the step S2. If r<head, the determination is not possible (step S5).

Step S6: If the character pointed to by the pointer r is the punctuation character (step S2), whether the positions pointed to by the pointers r and t are equal (r=t) or not is checked. If the first character pointed to by the pointer r is the punctuation character, the determination is not possible (step S9).

Step S7: If r=t in the step S6, the position pointed to by the pointer r is moved to the backward position (rightward in FIG. 3) (r←r+1). This is an end of the determination of the argument character string (step S8).

After the argument character string has been determined, the control means calls selection means 5 for selecting from the character buffer memory 2 one of words or lines which include the argument character string as portions thereof.

Figure 5A:
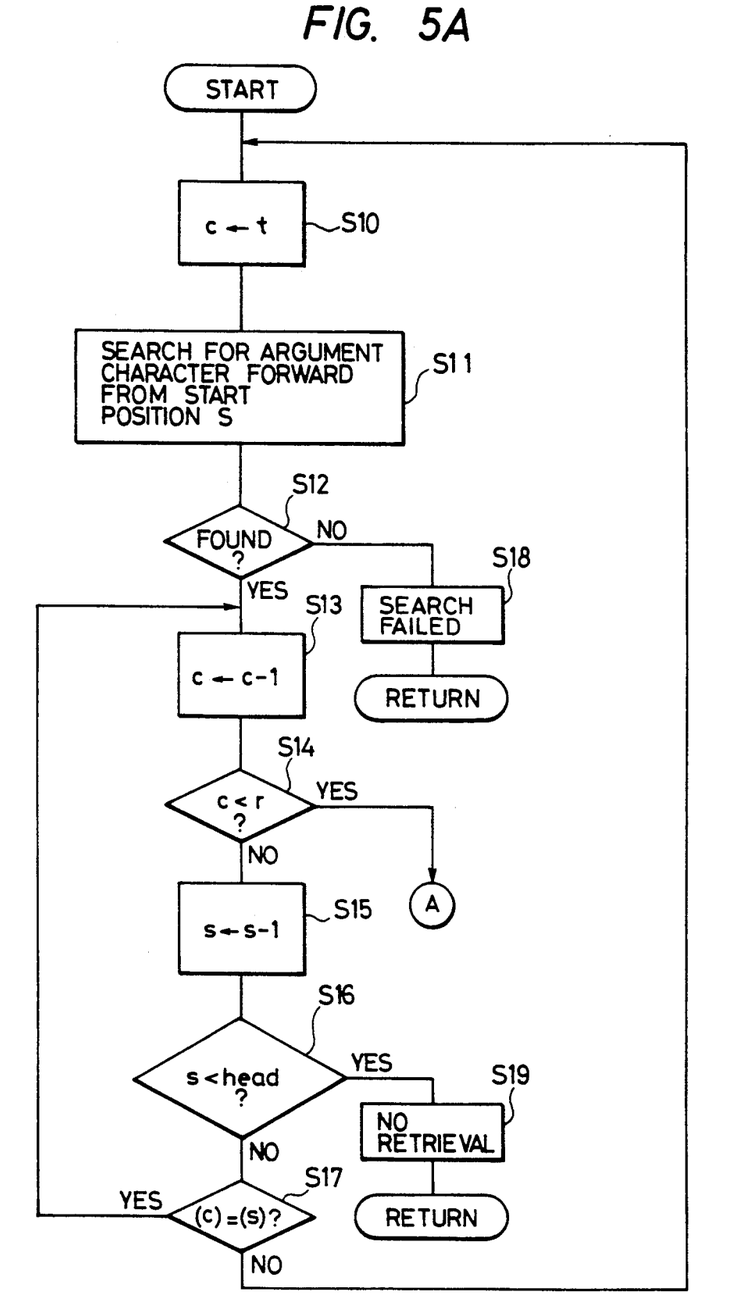
Figure 5B:
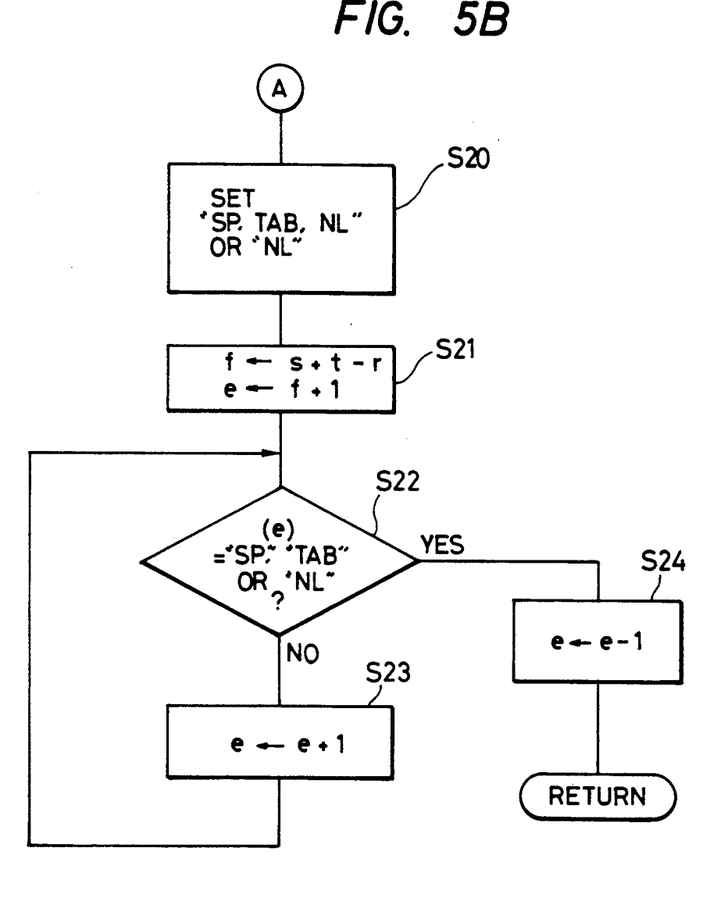

FIGS. 5A and 5B show the algorithm to be executed by the selection means 5. As shown in FIG. 5A, the selection means 5 sequentially selects an argument character (pointed to by the pointer c) starting from the last character "d" (pointed to by the pointer t in FIG. 3) of the argument character string STR1 in the forward direction (toward the pointer head position) to search the character string (search character string, which is "ind" shown by STR2 in FIG. 3) which is forward of the search start position 1 a position which is one character before the argument character string is an initial position) pointed to by the pointer S shown in FIG. 3 and which first matches with the argument character string. The algorithm shown in FIG. 5A is called a search unit because of such search function.

The algorithm shown in FIG. 5B determines the last portion (pointed to by the pointer e) of the character string to be expanded, depending on the type of character string (word or line) to be expanded. The algorithm of FIG. 5B is called a selection unit.

The steps of those algorithms are explained. In the search unit of FIG. 5A:

Step S10: points to an argument character by the pointer c. In order to point the last character "d" of the argument character string STR1 in FIG. 3, t is set into the pointer c.

Step S11: searches for the argument character starting from the search start position (initial position) pointed to by the pointer S toward the forward (left in FIG. 3) position of the character buffer memory.

Step S12: determines the presence or absence of the matched character. If it is not detected, the search fails (step S18).

Step S13: If the matched character is detected in the step S12, the position pointed to by the pointer c is advanced forward by one character position ($c \leftarrow c - 1$).

Step S14: Whether the position pointed to by the pointer c is forward (leftward in FIG. 3) of the position pointed to by the pointer r ($c < r$) or not is checked to determine the termination point of the comparison.

Step S15: If the comparison has not been completed, the position pointed to by the pointer S is advanced forward (leftward in FIG. 3) by one character position ($s \leftarrow s - 1$).

Step S16: Whether the position pointed to by the pointer s exceeds the head position of the character buffer memory or not is checked. If it does, the search fails (step S19).

Step S17: Whether the characters (contents) pointed to by the pointers c and s are equal or not is checked. If they are not equal, the control is returned to the step S10 is repeat the search. If they are equal, the steps S13 et seq are repeated.

In the selection unit shown in FIG. 5B:

Step S20: sets a punctuation character to designate either a word (space SP, tabulation TAB or carriage return NL) or a line (NL).

Step S21: sets the pointer f which points to the last portion of the argument character string and the pointer e which points to the last portion of the character string to be expanded ($f \leftarrow s+t-r$, $e \leftarrow f+1$).

Step S22: Whether the character pointed to by the pointer e is the punctuation character (SP, TAB, NL) or not is checked.

Step S23: If it is not the punctuation character in the step S22, the pointer e is shifted backward (rightward in FIG. 3) ($e \leftarrow e + 1$).

Step S24: If it is the punctuation character in the step S22, the pointer e is shifted forward (leftward in FIG. 3) ($e \leftarrow e - 1$).

Then, the control means 8 calls the expansion means 6. The expansion means 6 substitutes the argument character string in the character buffer memory 2 with the selected word or line. By the expansion means 6, the argument character sting is replaced by the selected character string.

In the present embodiment, the portion (STR 3 in FIG. 3) following to the search character string STR 2 selected by the selection means 5 is displayed on the display means 7 as if it were inputted by the character input means 1, and supplied to the character buffer memory 2 and the other processing means 9.

In order to improve the efficiency of processing, the expansion processing is preferably carried out in parallel with the determination of the end of the character string.

Figure 6:
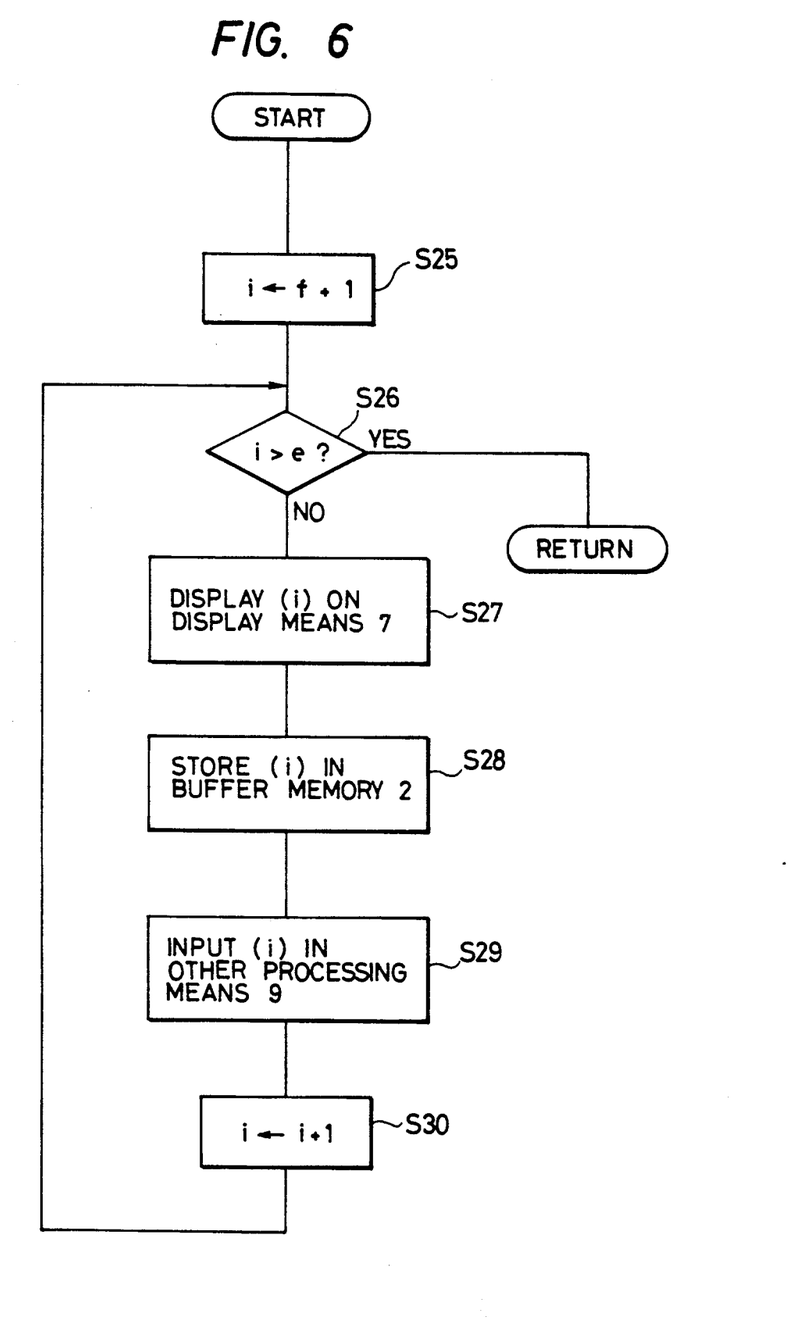

FIG. 6 shows the expansion algorithm.

Step S25: A position which is one character position backward (rightward in FIG. 3) of the position pointed to by the pointer f is set as a content of a variable 2'. Thus, the position immediately after the search character string (STR 2 in FIG. 3) is set as the variable i.

Step S26: Whether the variable i indicates a backward (rightward in FIG. 3) position of the pointer e or not is checked.

Step S27: The character at the position indicated by the variable i is displayed on the display means 7.

Step S28: The character at the position indicated by the variable i is stored in the character buffer memory 2.

Step S29: The character at the position indicated by the variable i is supplied to the other processing means 9.

Step S30: The position indicated by the variable i is shifted backward (rightward in FIG. 3) by one character position.

Figure 7A:
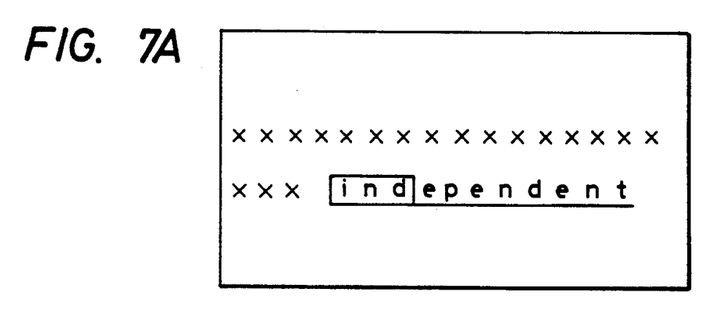
FIGS. 7A, 7B and 8 show display screens in the embodiment.
Figure 7B:
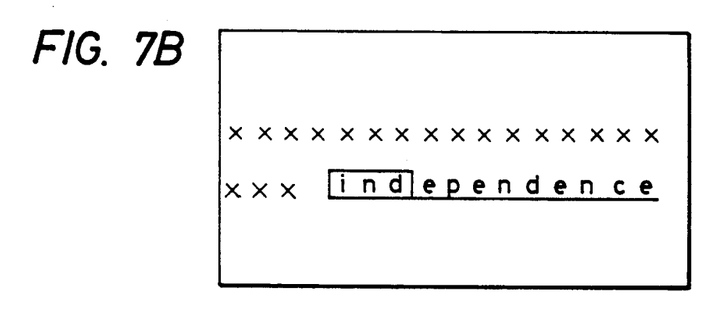

In this manner, the word "independent" is developed as shown in FIG. 7A. Because only a portion of the word is given to select the word, an unintended word/phrase may be selected.

If "independent" is the intended word, the input operation may be continued, but if it is not the intended word, the expansion instruction is further issued to develop the next candidate "independence".

When the expansion instructions are sequentially issued, the control means 8 cancels the affect by the previous expansion (steps S27–S29 in FIG. 6) and starts the next search from the position immediately before the search character string STR 2 which was found previously. That is, the search is done from the position S' (next search) shown in FIG. 3. As a result, the word "independence" which is forward of the previously selected word "independent" and which is selected by the same argument character string as that used previously is developed.

In the present embodiment, up to the predetermined number of most recent input characters are stored in the character buffer memory 2. Alternatively, a desired area of previously inputted text (that is, character string in a predetermined range which is adjacent to a specific edit position may be copied into the character buffer memory 2. A portion of the text memory which contains that area may be shared. In this manner, the words/phrases in the stored text can be utilized with the same input operation and reduce the input operation in correcting the text.

An information memory (memory or file) which contains preregistered words/phrases may be used in place of the character buffer memory 2, (In this case, the memory is a read-only memory.)

A plurality of character buffer memories, portions of text memory and/or files may be used in an appropriate search sequence. For example, a first character buffer memory which contains a small number of keywords and a second character buffer memory which contains up to a predetermined number of input characters are provided, and those buffer memories are sequentially searched so that the input operation of the keywords is saved.

When the character buffer memory which contains the up to predetermined number of input characters and a text memory which contains one-page content before the position to be corrected are searched, the searched and developed words/phrases can be copied into the character buffer memory. Accordingly, they may be used in correcting other position or other text.

In the present embodiment, the space, tabulation or carriage return character is used as the punctuation character in determining the argument character string. Alternatively, other characters may be used or the number of characters may be designated by the character input means following to the expansion instruction. Similar modification may be made in the selection and expansion so that the word which partially matches with the argument character string at the head portion thereof as well as the words which partially matches at an intermediate or tail portion thereof can be developed. This modification provides a retrieval effect when a word of uncertain spelling is inputted. When a portion from the argument character string to the punctuation character is copied, it is simpler than a cut and paste method.

Figure 8:
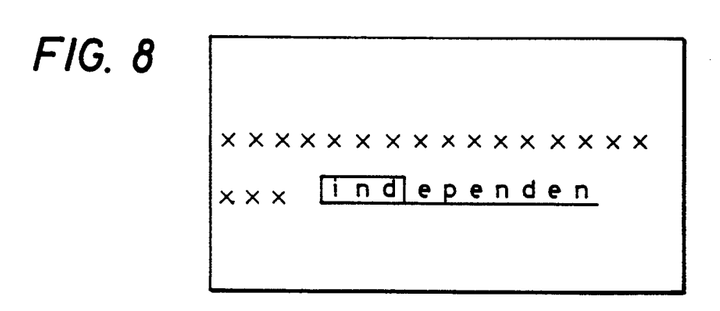

In the present embodiment, the word/phrase having the argument character string as a portion thereof is selected and developed. In actual use, however, the end portion of the developed word is frequently changed due to inflection. Accordingly, instead of simply developing the first selected word, two (or more) words having the argument character string as portions thereof may be selected and a common portion thereof may be expanded. The expansion of the common portion of the text shown in FIG. 2 is shown in FIG. 8.

In the present embodiment, the argument character string is stored in the character buffer memory. Alternatively, the argument character string may be stored in separate character string memory means.

In accordance with the present invention, the character input operation can be saved without previously registering the words and without complex operation so that a text editing apparatus of high efficiency is provided.

In the embodiment of the present invention, memory means (e.g. one-page memory) for storing the input words is provided and a desired word can be selected therefrom by searching the word which includes a portion (e.g. head portion) of the desired word. Accordingly, unlike the copy operation done in the prior art apparatus, a portion of the input can be omitted in searching the desired word and a smooth input operation is attained.

The content of the memory means is automatically updated and the pre-registration of the words is not necessary. Thus, the input operation is saved irrespective of the command language.

When the present invention is applied to an electronic typewriter, the display means may be a liquid crystal display. The present invention may also be used as an intelligent terminal or a complex terminal.

When the present invention is applied to a Japanese word processor, the input operation for KANA characters or alphabet characters can be saved and the input operation for a Japanese text including KANJI characters can also be saved by setting an appropriate punctuation character (because the present invention can be applied to any characters (data)).

What is claimed is:

1. A text editing apparatus comprising:
   input means for inputting a plurality of character strings;
   memory means for storing therin the plurality of character strings input by said input means;
   display means for displaying the plurality of character strings stored in said memory means;
   instruction means for generating an instruction which commands the searching of the plurality of input character strings stored in said memory means for a desired character string which includes the latest one of the plurality of character strings input by said input means;
   character string search means for searching the plurality of character strings stored in said memory means for the desired character string in response to the instruction generated by said instruction means, said search means performing the search by detecting the latest inputted end mark which indicates the end of a character string and by employing a character string input after the latest end mark as the latest character string and outputting the stored character string which includes the latest character string; and
   means for substituting the output character string located by said character string search means for the latest character string in said memory means.

2. A text editing apparatus according to claim 1, wherein said memory means comprises a ring buffer memory.

3. An apparatus according to claim 1, wherein the end mark includes one of a space mark, a tab mark, and a carriage return mark.

4. A text editing apparatus comprising:
   input means for inputting a plurality of character strings;
   memory means for storing therein the plurality of character strings input by said input means;
   output means for outputting the plurality of character strings;
   instruction means for generating an instruction which commands the searching of the plurality of character strings stored in said memory means for a character string which includes the latest one of the plurality of character strings input by said input means, and for selecting the character string which includes the latest character string;
   search means for performing the commanded search by detecting the latest inputted end mark which indicates the end of a character string and by employing a character string input after the latest end mark as the latest character string, and for causing said output means to output the selected character string in response to the instruction generated by said instruction means; and
   means for substituting the selected character string for the latest character string in said memory means.

5. A text editing apparatus according to claim 4, wherein said memory means comprises a ring buffer memory.

6. An apparatus according to claim 4, wherein said output means comprises display means for visually displaying character strings.

7. An apparatus according to claim 4, wherein the end mark includes one of a space mark, a tab mark, and a carriage return mark.

8. A text editing method comprising the steps of:

inputting a plurality of character strings;

storing the plurality of character strings inputted in said inputting step in a memory;

displaying the plurality of character strings stored in the memory;

generating an instruction which instructs the searching of the plurality of input character strings stored in the memory for a latest one of the input character strings;

searching the plurality of character strings stored in the memory in response to the instruction generated in said generating step by detecting the latest inputted end mark which indicates the end of a character string and by employing a character string input after the latest end mark as the latest character string and outputting the stored character string which includes the latest character string; and substituting the output character string located in said searching step for the latest character string in said memory means.

* * * * *

UNITED STATES PATENT AND TRADEMARK OFFICE
CERTIFICATE OF CORRECTION

PATENT NO. : 5,262,948
DATED : November 16, 1993
INVENTOR(S) : EIJI KATO

It is certified that error appears in the above-indentified patent and that said Letters Patent is hereby corrected as shown below:

COLUMN 1
  Line 49, "operation" should read --operation,--.

COLUMN 5
  Line 45, "is" should read --to--.
  Line 46, "seq" should read --seq.--.

COLUMN 6
  Line 1, "sting" should read --string--.
  Line 4, "to" should be deleted--.
  Line 41, "affect" should read --effect--.

COLUMN 7
  Line 19, "to" should be deleted.

Signed and Sealed this

Twelfth Day of July, 1994

BRUCE LEHMAN

Attest:

Attesting Officer

Commissioner of Patents and Trademarks